Jan. 22, 1963 W. E. FRANK 3,074,183
PROJECTING MEANS FOR PLANETARIUMS
Filed Jan. 3, 1961 6 Sheets-Sheet 1

*INVENTOR.*
WALLACE E. FRANK
BY
ATTORNEYS

Jan. 22, 1963　　　　　W. E. FRANK　　　　　3,074,183
PROJECTING MEANS FOR PLANETARIUMS
Filed Jan. 3, 1961　　　　　　　　　　　　　6 Sheets-Sheet 3

FIG. 4.

INVENTOR.
WALLACE E. FRANK
BY
ATTORNEYS

Jan. 22, 1963   W. E. FRANK   3,074,183
PROJECTING MEANS FOR PLANETARIUMS
Filed Jan. 3, 1961   6 Sheets-Sheet 4

INVENTOR.
WALLACE E. FRANK
BY

ATTORNEYS

Jan. 22, 1963 W. E. FRANK 3,074,183
PROJECTING MEANS FOR PLANETARIUMS
Filed Jan. 3, 1961 6 Sheets-Sheet 5

INVENTOR.
WALLACE E. FRANK
BY
ATTORNEYS

Jan. 22, 1963 W. E. FRANK 3,074,183
PROJECTING MEANS FOR PLANETARIUMS
Filed Jan. 3, 1961 6 Sheets-Sheet 6

*INVENTOR.*
WALLACE E. FRANK
BY
ATTORNEYS

United States Patent Office 3,074,183
Patented Jan. 22, 1963

3,074,183
PROJECTING MEANS FOR PLANETARIUMS
Wallace E. Frank, Westtown, Pa., assignor to Spitz Laboratories, Inc., Yorklyn, Del., a corporation of Delaware
Filed Jan. 3, 1961, Ser. No. 80,269
38 Claims. (Cl. 35—45)

This invention relates to planetariums and particularly to planet projection apparatus affording many advantages over the prior art.

Planet projection apparatus of the type employed at present generally involve mechanical assemblies imparting complex movements to optical projectors including lamps which necessitate electrical connections compatible with the elaborate movements involved. The inertia of the parts of such an assembly gives rise to problems of unbalance and vibration, the latter being highly objectionable because of the great magnifications of movement involved on the planetarium dome. Considering that in a typical planetarium there will generally be seven or even more of such projecting assemblies, including the five major planets, the Sun and the Moon, the problems become cumulative, particularly in view of the fact that, because of the masses involved, a common drive is required to maintain proper synchronism from a single sufficiently powerful source of motion. Accordingly, it is the general object of the invention to provide planet projection apparatus, involving a basically different approach to planet projector design, which is noteworthy in its simplicity and in avoidance of the problems just indicated.

In brief, the invention involves the following:

There are provided individual projectors for the planets, each having movable parts which are compact and light in weight and driven by individual small low-powered synchronous motors. These motors may be driven synchronously at widely variable speeds from a common adjustable frequency source comprising a variable frequency oscillator.

The optical system involved in each projector is stationary as to all of its parts except for very light reflecting means positioned by an epicyclic gear train. Accordingly, a powerful light source may be used, if desired, without complications due to its size or weight or the size of the optical system associated therewith, and without electrical lead complications.

As will hereafter appear the display of the planetary orbits as inclined to the plane of the ecliptic is readily secured within the projection assembly itself, making possible uniformity of mounting of the projection assemblies on a common plate or a pair of parallel plates.

The projector in accordance with the invention may involve a simple occulting system for blanking out images as they should disappear below the horizon. Intensity and color variations of the images may also be simply provided. Also involved according to the invention is the dividing of the image-projecting light beams to prevent occultation by the projector housing cage structure.

Advantages are also involved in matters of simplicity of construction in that the various projectors are basically similar and differ from each other only in gear ratios or orbit-inclination determining means. The basic similarity is for all planets, both superior and inferior.

The objects of the invention are concerned with the attainment of the various advantages indicated above, and these, as well as other objects relating to advantageous details of construction and operation will become apparent from the following description, read in conjunction with the accompanying drawings, in which:

Figure 1:
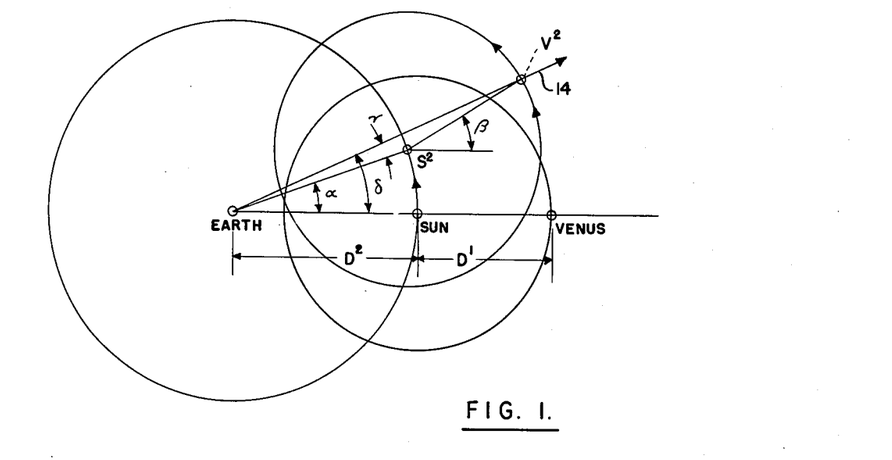
FIGURE 1 is a schematic illustration of the principles and movements involved in projecting the image of an inferior planet in accordance with the invention.
Figure 2:
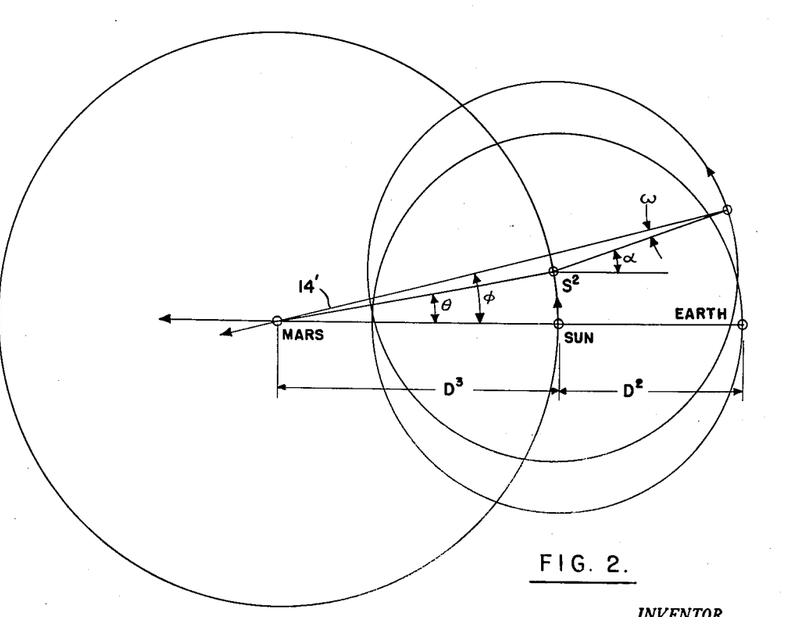
FIGURE 2 is a schematic illustration similar to FIGURE 1 and representing such principles and movements with respect to a superior planet.

As a basis for an understanding of the detailed aspects of the invention, reference may first be made to the diagrams constituting FIGURES 1 and 2.

First, it should be noted that the scale of the projector is very much smaller than the scale of the dome on which projection is to occur, so that any part of the projector may well be regarded as concentrated at the center of the dome. Interest is, therefore, centered entirely on angular relationships of the approximate radii along which the planet images are projected. Any displacements, generally of no more than a few inches, of the projectors relative to each other, or of the various projectors from the center of the dome, would be represented merely by corresponding linear distances on the dome itself, with negligible errors of angles.

Bearing this in mind, reference may be made to FIGURE 1, characteristic of the aspects of the projection of an inferior planet, here taken as Venus. The Earth, Sun and Venus are here shown in an initial (and arbitrary) position of alignment in a straight line. The scale of distances $D^1$ and $D^2$ from the Sun is accurate. The two planets travel about the Sun at their proper relative rates, and the lines joining the pairs will project to paths on the celestial sphere carrying the fixed stars.

The ordinary assumption for a diagram such as this would be to have the Sun stationary and the planets moving. From the standpoint of a planetarium what is of interest is a geocentric approach, or in other words the apparent relative movement between the Sun and the planet (Venus) as viewed from the Earth, with the projection of the Sun and planet images on the celestial sphere to move relative to the stars. Since we are concerned only with angles, it will be evident that so long as relative movements are preserved, the point and line elements in the diagram may very well be rotated about the Earth as center. In the projector about to be described in detail, the last is the situation used. An axis perpendicular to the plane of the paper and through the Earth is fixed. About this axis the Sun rotates. In turn, about the Sun the planet (Venus) rotates. The angles of rotation, i.e. of the lines joining the pairs of the elements, are for similar periods proportional to the angles of rotation of the two planets about the Sun. Suppose, for example, that in a given time the Earth rotates relative to the Sun through the angle α. In the same time, Venus will rotate about the Sun through the angle β. Both of these angles may be regarded as relative to a fixed radius vector pointing to some particular point on the celestial sphere. Although in the diagram of FIGURE 1 the movement of Venus with respect to Earth is through the angle δ, the actual apparent movement or vector sum rotation of Venus relative to the Sun as viewed from Earth is through the angle γ, while a relative movement between Venus and the Sun is through the angle β. It will be evident that the above angles bear a relation to the heliocentric longitudes commonly used in astronomy. Nevertheless, since it will be understood that the image of the Sun is separately projected and its relative movements simulated by separate means provided in the planetarium, the motion of the planet Venus relative to the celestial sphere is projected along the radius vector 14. As will hereafter appear, projection in this direction is provided by reflecting means, such as a mirror or prism, provided at the said vertical axis of rotation through the Earth and arranged to reflect along the radius vector an image projected from a fixed projector along that axis.

The inclination of the orbit of Venus with respect to the plane of the ecliptic has so far been neglected, and if Venus was to be projected in the plane of the ecliptic such a mirror would make an angle of 45° with respect to the said vertical axis of rotation.

If, however, as is practically required, the orbit of Venus is to be shown as inclined to the plane of the ecliptic, it is merely necessary to involve a tilt of the mirror with respect to the 45° angle just mentioned, the tilt being fixedly in a direction bearing a definite position in the celestial sphere. As will appear hereafter, this is simply approximated by providing a sloping plane in the system having a fixed relationship to the associated star projector.

Referring now to FIGURE 2, without undue elaboration of the description thereof, matters of relationships may be followed in basically the same fashion as was involved in considering FIGURE 1. Here a superior planet is involved which is typically illustrated as Mars. Again, in accordance with the conventional viewpoint, Earth and Mars rotate about the Sun. But from the standpoint of relative angles, Mars may now be regarded as defining a fixed axis perpendicular to the plane of the paper, with the Sun rotating about this axis, and with the Earth rotating about the Sun. Again assuming a proper linear scale of Sun distances $D^2$ and $D^3$, and proper relative rates of rotation, as the Earth rotates through the angle α, the Sun may be regarded as rotating relative to Mars through the angle θ. The Earth accordingly rotates, assuming Mars as an axis, about the angle φ, but from the standpoint of considering the Earth as a center of observation or projection, Mars may be regarded as having rotated through the angle ω with respect to the Sun. The vector sum rotation between Mars and the Sun will then be through the angle ω. Obviously, proper projection of Mars will now involve projection of an image along the radius vector 14′ running from the position of the Earth through the position of Mars, and effecting projection through the medium of a mirror as previously described, which mirror will be centered on the axis through Mars. Again by proper maintenance of mirror inclination the inclination of the orbit of Mars relative to the plane of the ecliptic will be established and the apparent path of Mars along the celestial sphere properly reproduced.

Considering the diagrams of FIGURES 1 and 2 as foundations for a mechanical system, it will be evident that the mechanical system is common for the two diagrams, and that, in fact, the mechanical systems could be identical except for gear ratios involved and for the inclinations imparted to the respective mirrors which would merely face in opposite directions. So long as relative linear dimensions were achieved to correspond to the bodies involved, the mechanical radius between the Earth and the Sun in FIGURE 1 and that between Mars and the Sun in FIGURE 2 could be identical.

Figures 3, 13:
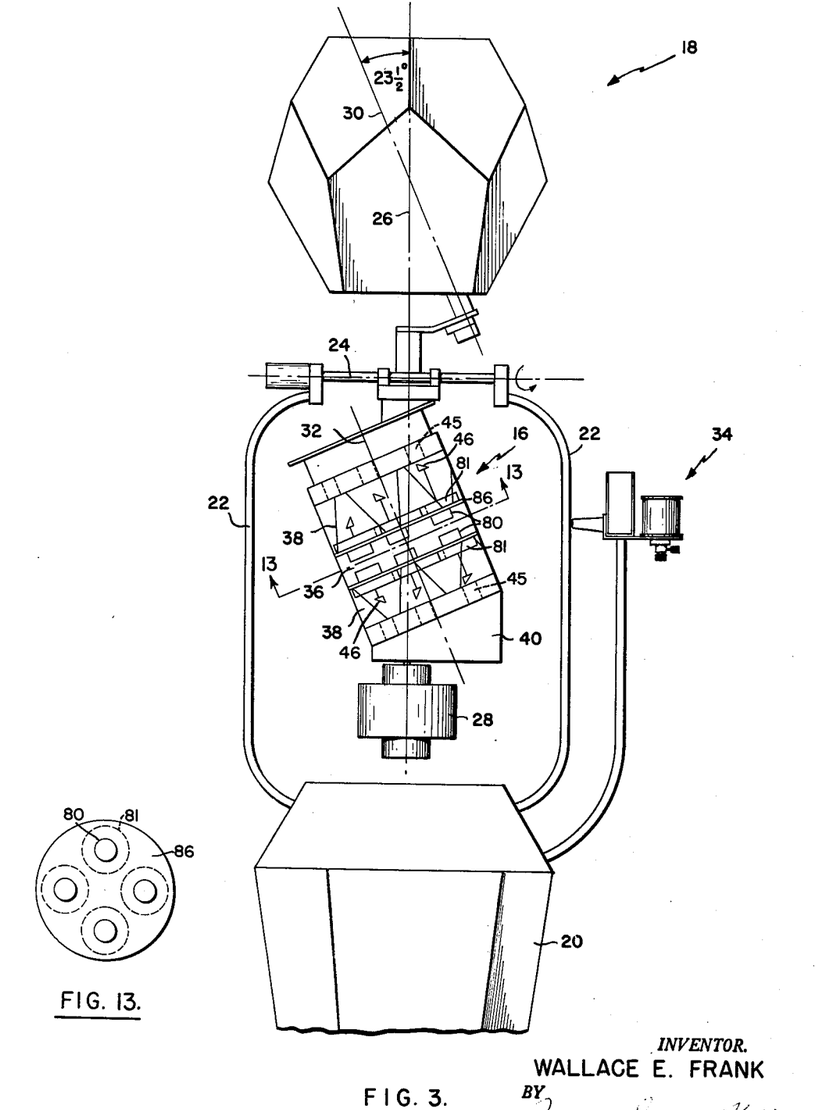
FIGURE 3 illustrates the overall arrangement of parts in a planetarium embodying the invention.
FIGURE 13 is a sectional view taken along the plane of line A—A in FIGURE 3.

Having described the principles and movements involved, referring next to FIGURE 3 there is shown schematically complete planetarium apparatus embodying the invention. The two principal parts of the planetarium are the planet projection apparatus 16, which is the main subject matter of the invention, and star projection apparatus 18 comprising a dodecahedron, for example, as illustrated. The dodecahedron is, of course, an example of typical star projection apparatus and is conventional, detailed description therefore being unnecessary. Projectors 16 and 18 are supported from a base 20 by upwardly extending legs 22. The complete assembly may be tilted about an axis 24 to obtain different latitudes of observation. The axis 26 passing through the planet projector 16 and star projector 18 represents the Earth's polar axis and a motor provided in the upper end of projector 16 is operable to effect rotation about this axis. At the lower end of projector 40 there is provided apparatus 28 for projecting coordinates on the planetarium dome. The axis 32 of projector 16 is perpendicular to the plane of the ecliptic and represents the precessional axis. Projector 18 similarly has a precessional axis 30 parallel to axis 32, the axes 30 and 32 both being inclined at an angle of 23½° to the axis 26. Auxiliary projection apparatus are shown at 34. As shown in FIGURES 3 and 13, the projector 16 has a section 36, which houses synchronous motors 80 for driving the individual planet projection units 81, and cage sections 38 containing such projection units. At a later point herein there will be described optional means for dividing the projecting light beams to avoid the undesirable effects of occultation by the struts forming these cages. As previously touched upon, the individual small, low-powered synchronous motors are driven from a common adjustable frequency source comprising a variable frequency oscillator, and it will be evident that this novel arrangement affords decided advantages over prior art arrangements involving complex driving connections. Moon projection apparatus is housed in the lower section 40.

Figure 4:
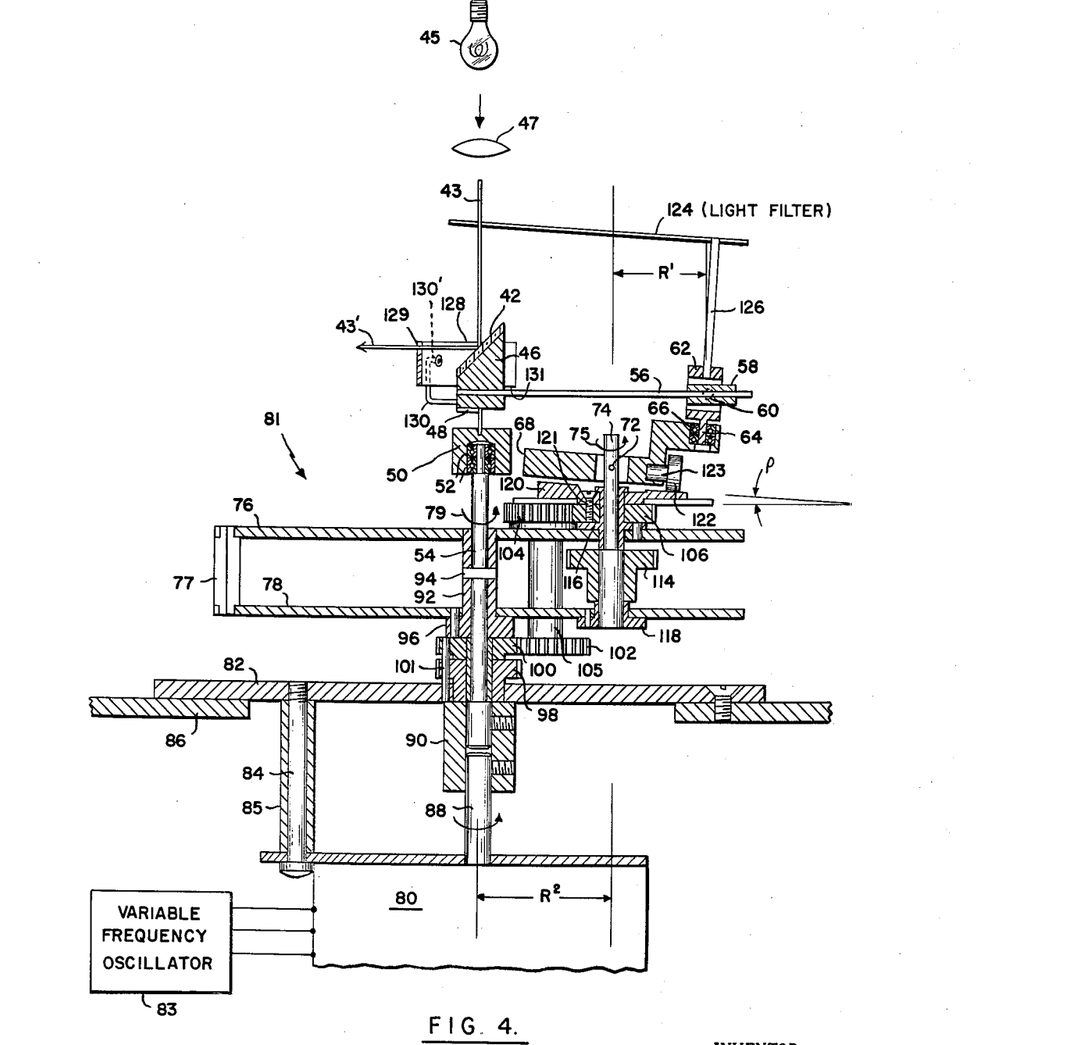
FIGURE 4 is a vertical, axial cross-section through an individual projection unit employed in planet projection apparatus according to the invention.

Referring next to FIGURE 4, the structure of one planet projection unit according to the invention will now be described specifically. Since Venus has been used as an example in the foregoing description, the projection unit for Venus will be described as typical of the units for other planets. The aforementioned reflecting means is constituted by a small mirror 42 mounted on a block 46. It will be understood that the reflecting means is not limited to a mirror, but that a prism, for example, would be equally satisfactory. Block 46 in turn is mounted for tilting movement about a horizontal axis by means of a piano type hinge 48 having its lower leg fixed in a cap 50 which is mounted on a vertical shaft 54 by means of frictionless bearings 52, the cap 50 being freely rotatable on shaft 54. By virtue of the mirror mounting described, the mirror 42 is positioned, at approximately a 45° inclination, directly over the central axis of shaft 54 and a light source schematically illustrated at 45 is positioned to direct, through a suitable focusing lens arrangement indicated at 47, a concentrated beam of light 43 directed at the mirror 42 and coinciding with this shaft. By virtue of the fact that the light source 45 is stationary, as compared to prior art arrangements, this source may comprise a relatively large lamp bulb of very high wattage. This, of course, is highly desirable, but as previously explained it would not be feasible if the light source were movable, as in prior art projectors, because the optical elements necessarily involved give rise to undesirable unbalance and vibration. Also, because of this stationary mounting slip rings are not needed to connect the light to an electrical source and further bothersome problems thereby are avoided. A stiff wire or rod 56 is rigidly connected at its left end (FIGURE 4) to the block 46 and at its other end rod 56 is reciprocably received in a sleeve 58 which is gimballed in a pedestal 62 by a pin 60. The rod 56 intersects the plane of mirror 42 at a 45° angle. The pedestal 62 is rotatably mounted on a disc 68 by means of a frictionless bearing 66 in which a reduced lower shank 64 of the pedestal is received. Disc 68 is mounted on a vertical shaft 75 by means of a pin 72, whereby the disc 68 is rotatably fixed with respect to the shaft but tiltable for inclination to the horizontal. Shaft 74 is rotated by the epicyclic gear train to be described hereafter, but for the present it may be noted that its direction of rotation is counterclockwise when viewed from above, as indicated by the arrow 75. Shaft 74 is journalled in a rotatable platform generally indicated at 81 and comprising upper and lower plates 76 and 78, respectively joined by spacer members 77. As described hereafter, platform 81 is driven in a counterclockwise direction if viewed from above and as indicated by arrow 79.

At this point, the principles elaborated with reference to FIGURE 1 may be tied in with the structure in FIGURE 4 that has been thus far described. The axis of shaft 74 corresponds to the point representing the Sun in the diagram of FIGURE 1, with the pedestal 62 generally representing Venus. Consider the axis of shaft 54 in FIGURE 4 as corresponding to the point representing Earth in FIGURE 1. As in the case of FIGURE 1, the shaft 74 is moved by the platform 81 in a counterclockwise circular path about the axis of shaft 54, while disc 68 revolves counterclockwise about shaft 74. The rod 56 leading from block 46 intersects the axis of shaft 54, and it will be recalled that cap 50 is freely rotatable about this shaft. Considering the axis of shaft 54 as representing the Earth and the axis of pedestal 62 (passing through shank 64) as the planet Venus, it will be evident that as disc 68 and platform 81 revolve the axis of rod 56 will be oriented in accordance with the line of sight 14 between Earth and Venus previously indicated in FIGURE 1. This directional orientation of the rod 56 will be transmitted to the mirror 42 and projected on the planetarium dome, it being noted that the reflected light beam 43' and the rod 56 are in the same plane.

Figure 5:
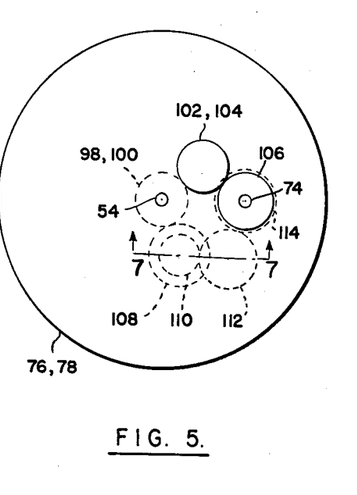
FIGURE 5 is a horizontal cross-section of the structure shown in FIGURE 4, illustrating the epicyclic gear train.
Figure 6:
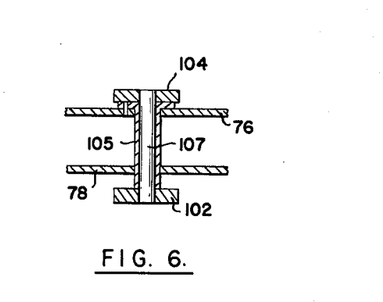
FIGURE 6 is an elevation of certain epicyclic gear train parts which are hidden in FIGURE 4.
Figure 7:
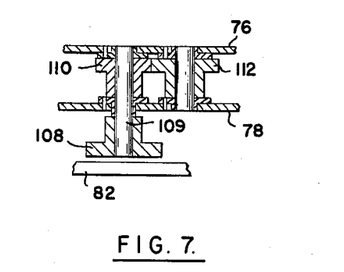
FIGURE 7 is a vertical cross-section taken on line 7—7 of FIGURE 5.

It will be evident that the relative spacings and dimensions of the described parts is of special significance. In FIGURE 4 the radius from the axis of shaft 74 to the pin 60 is designated $R^1$. (Although $R^1$ may vary due to tilting of disc 68 about pin 72, the effects of such variation may be considered negligible.) The radius from the axis of shaft 54 to the axis of shaft 74 is designated $R^2$. The radii $R^1$ and $R^2$ correspond, respectively, to the distances identified $D^1$ and $D^2$ in FIGURE 1. Thus the ratio of $R^1$ to $R^2$ is the same as the ratio of the Sun distances of Earth and Venus. The epicyclic drive means will now be described with additional reference to FIGURES 5, 6 and 7. A synchronous motor 80 is supported from a plate 82 by threaded studs 84 and spaces 85, the plate 82 being fastened to a main supporting plate 86. The aforementioned variable frequency oscillator is indicated at 83, and it will be understood that although the other planet projection units are not shown, because as explained they are basically the same as the unit being described, this oscillator drives all of these units. In such manner synchronism of the planet projection units is attained, thereby avoiding the problems associated with prior art arrangements involving complex gear trains, belt drives, etc. The output shaft 88 of motor 80 is driven in a counterclockwise direction as indicated and is rotatively coupled to shaft 54 by a sleeve coupling 90. A central sleeve 92 of platform 81 is concentric with shaft 54 and is affixed thereto by a pin 94. A pair of sun gears 98 and 100 concentric with shaft 54 are fixedly connected to plate 82 by a pin 101. Two separate epicyclic trains are involved. First, sun gear 100 meshes with a planet gear 102 which, as shown in FIGURE 6, is fixed to a shaft 107 journalled in a fixed bearing sleeve 105 and having a further planet gear 104 at its upper end. Gear 104 in turn meshes with a gear 106 concentric with shaft 74, as seen particularly in FIGURE 5. Gears 100, 102, 104 and 106 are of the same diameter and pitch. A second and separate train is constituted by the sun gear 98 which meshes with a gear 108 fixed to a shaft 109 as seen particularly in FIGURE 7. Shaft 109 is journalled in plates 76 and 78 and at its upper portion carries a planet gear 110 which in turn meshes with a planet gear 112 similarly journalled. Gear 112 meshes with a gear 114 which is also rotatably fixed on shaft 74. Gears 98, 108, 110, 112 and 114 are of identical pitch and the series relationship of their diameters is 43:99:72:50:50, respectively. Shaft 74 is freely journalled in plates 76 and 78 by bearing sleeves 116 and 118, respectively, which are fixed against rotation by pins as illustrated.

Earlier in this application, reference was made to the projection of a planet image taking into account the deviation of the planet's orbit from the plane of the ecliptic, and this aspect will now be described. In FIGURE 4, there will be noted a disc 120 having its upper surface inclined to its bottom surface by an angle indicated $\rho$. Accordingly, the disc will be referred to hereafter as wedge 120. This wedge is concentric with and freely rotatable about bearing sleeve 116, but is secured in fixed relationship with gear 106 by means of a machine screw 121. The purpose of wedge 120 is to effect the tilting motion of disc 68 about pin 72, and to this end there is provided a roller 122 freely rotatable on a stud 123 in disc 68. It is evident, therefore, that rotation of disc 68 relative to wedge 120 will result in a raising and lowering of pedestal 62, with corresponding raising and lowering of the end of rod 56 reciprocable in sleeve 58. Such vertical adjustment of the rod 56 is transmitted to the block 46 which pivots about the piano hinge 48, and results in a corresponding vertical adjustment (as viewed in FIGURE 4) of reflected light beam 43' within the plane common to beam 43' and rod 56.

The angle $\rho$ is determined by the inclination of the planet's orbit to the plane of the ecliptic, and in the case of Venus its orbit is inclined 3°24' to the ecliptic. Thus the upper surface of wedge 120 is machined at the angle necessary to cause beam 43' to be deflected through an angle of 3°24' with respect to the planes of plates 76 and 78. With respect to the angle $\rho$, however, it should be noted that a given angular deflection of the beam 43' is related to the angular tilting adjustment of the mirror which causes it by a ratio of 2:1.

From the foregoing description it is apparent that there are three basic movements involved in the mechanism shown in FIGURE 4. First, there is the direct rotation of platform 81 by motor 80 about the axis of shaft 54, whereby shaft 74 is revolved bodily about this axis. Secondly, there is the counter-clockwise rotation of disc 68 about the axis of shaft 74. The epicyclic gear train including gears 98, 108, 110, 112 and 114 is so designed that the relation between the speeds of rotation of disc 68 and platform 81 is in accordance with the ratio of the sidereal periods of Venus and the Earth. Lastly, there is the clockwise rotation of wedge 120 relative to platform 81. The motion of wedge 120 about the axis of shaft 54 is translatory. That is, as disc 68 revolves about shaft 54 a straight line on the face of disc will nevertheless remain aligned in a given direction. This may be borne out more clearly by inspection of the epicyclic gear train including gears 100, 102, 104 and 106, which gears are of the same diameter and pitch as previously mentioned. The reason, of course, for this arrangement is that the Earth's orbit about the Sun is fixed with respect to the universe and does not change. In other words, the orbit is to be represented as being fixed directionally, with respect to the compass points of the planetarium dome, or in terms of heliocentric longitudes.

From the foregoing it should be clear that in effect the invention constitutes a mechanical analog system, driven by epicyclic gear means, wherein movements imparted to reflecting means are determined by the relationships of mechanical parts and are functions of the actual spatial relationships of celestial bodies.

Reference also has been made to the aspect of simulating the variations in appearance of a planet as it passes through its various stages. In FIGURE 4 there is shown an extension 126 of pedestal 62, and this extension mounts a filter 124 that extends across the light beam 43. As is well known, the greatest brillancy of Venus as evening and morning star occurs slightly before and slightly after inferior conjunction. When these more brilliant stages of Venus are projected by the apparatus, the pedestal 62 has revolved about shaft 74 to a much smaller distance from the axis of shaft 54, representing Earth, than is shown in FIGURE 4. This necessarily is accompanied by movement of filter 124 toward the left in FIGURE 4 and the projection of light beam 43 through a more central area of the filter. The light transmitting characteristic, or transparency, of filter 124 therefore is not made uniform but is variable across its face in accordance with the brillancy of Venus in such various stages.

The occulting of images at the horizon, previously mentioned, involves a shade 128 pivotally hung from a wire support 130 which is fixedly secured to block 46, the pivot axis 130' being oriented at an angle of approximately 45° to the beam 43' and rod 56. In progression downwardly from the upper edge portion 129 toward the vertically central area of the shade, its light transmitting characteristic or transparency varies from complete or considerable transparency at the extreme edge to complete opaqueness slightly below it. Because in operation the axis of shaft 54 (which is parallel to the axis 32 in FIGURE 3) is inclined at various angles to the vertical, and the shade 128 pivots about an axis at 130' which is 45° from the reflected beam 43' to maintain constantly a horizontal position, the upper edge portion 129 will variably be higher or lower with respect to this beam. In such a manner, as the image-projecting light beam sweeps below the simulated planetarium horizon it is dimmed and cut off gradually rather than suddenly, thereby to imitate more realistically the actual phenomenon in nature. Likewise, as the beam sweeps above the horizon it brightens and appears gradually.

As previously described the apparatus is rotatable about axis 24 (FIGURE 3) to represent observation from either hemisphere and therefore it will be understood that a unit such as shown in FIGURE 4 may be upright or upside-down depending upon the hemisphere setting. If this unit is in the latter position, it will be the edge portion 131 instead of edge portion 129 that will effect the occulting of beam 43', the shade 128 then having flipped over about its pivot. For this reason the edge portion 131 also is variable in transparency—from complete or considerable transparency at the edge to opaqueness at the vertically central area of the shade. Hereafter there will be described optional and modified occulting means of a preferable though more complex type which is applicable to the projection unit illustrated in FIGURE 3.

Figure 8:
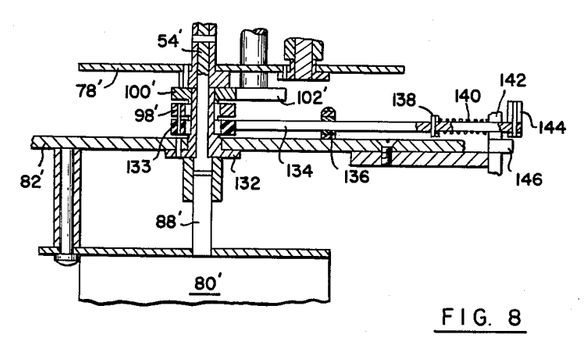
FIGURE 8 illustrates the provision of optional clutch means which facilitates setting and adjustment of the projection unit.

In the overall planet projection apparatus all of the individual planet projection units are, of course, adjusted so that they are in proper phase with relation to each other. The attainment of a given setting for any individual unit may be effected by operation of its synchronous motor until this setting is reached. However, this may be considerably time consuming, especially in the case of projection units driven by synchronous motors having quite low speeds. Accordingly, to facilitate the individual setting of the projection units, there may be provided clutch means as will now be described with reference to FIGURE 8 to temporarily disconnect the epicyclic gear train from its driving synchronous motor. In FIGURE 8, parts identified by primed (') reference numerals correspond to parts bearing the same reference numerals in FIGURES 4 to 7. In FIGURE 8, the sun gear 100' is permanently keyed to a sleeve 132, concentric with shafts 54' and 88', which sleeve in turn is keyed to the plate 82'. The sun gear 98', however, is fixed against rotation only by virtue of its being connected to a wheel 133 by means of a pin as illustrated. Wheel 133 is formed of a material, such as porous rubber, having a high coefficient of friction and gripping qualities, and is adapted to be fixed against rotation by a rod 134. The left end of this rod 134, which end also may be tipped with rubber or the like, is adapted to restrain rotation of wheel 133 by engagement therewith, and is held in its inner gripping position by a spring 140 bottomed against a fixed member 142 and acting against a collar 138 on the rod. A sliding bearing for rod 134 is provided at 136, and a handle 144 for withdrawal of the rod 134 against action of spring 140 is provided. A stop 146 affords convenient locking of handle 144 in the outer position. The wheel 133 and rod 134 constitute in effect a friction clutch which will inhibit rotation of gear 100' unless a force substantially greater than normal is applied through the gear train. If, then, it is desired to adjust the setting of the unit, this may be effected merely by resisting rotation of disc 78' (actually the platform 81 constituted by discs 76 and 78) while operating its motor, whereby the clutch is caused to slip and the desired elements are driven. Alternatively, rod 134 may be withdrawn and the elements may be set manually, though because of the delicate gearing employed this is not particularly recommended. It will be understood that by means of suitable dials (not shown) that may be provided the projection unit is set by reference to and in accordance with a standard table of heliocentric longitudes at the particular point of time desired. No provision has been made for the release of the epicyclic gear train for driving the wedge 120, for the reason that once the wedge 120 is set in its proper relation it is desirable to prevent disturbance of its setting.

The unit described with reference to FIGURES 4 to 7 is intended for the projection of an image representing movement of the planet Venus. In connection with FIGURE 2, the only difference between the projection of an inferior planet such as Venus and the projection of a superior planet such as Mars is that the sun is considered to revolve about the superior planet and the Earth is considered to revolve about the Sun. This, of course, is in contrast to considering the Sun as revolving about the Earth and the inferior planet as revolving about the Sun. With the exception of the selected speed of the synchronous motors, the design of the epicyclic gear trains and the proportioning of the parts, the construction of a projection unit for a superior planet is basically the same as that previously described for an inferior planet. One significant distinction exists, however, with respect to the mounting of the reflecting mirror. It will be recalled that the projected line of sight 14 from Earth to Venus was radially outward in FIGURE 1 whereas in FIGURE 2 the line of sight 14' from Earth to Mars was radially inward. In order, therefore, to bring the projected image of Mars into proper relation with the projected image of Venus the mirror is merely mounted to face in a direction opposite to that of the mirror in FIGURE 4. In other words, whereas in FIGURE 4 mirror 42 faces away from the pedestal 62, in a projected unit for a superior planet the corresponding mirror would face toward the pedestal.

As previously described a plurality of individual planet projection units are mounted on the main supporting plate 86 within each cage section 38. As the light beams 43' reflected from the mirrors 42 sweep through 360° in planes near the plane representing the ecliptic, there may be involved a slight effect of parallax due to the spacing of the units about the plate 86. This effect may be considered negligible and of little interest in a planetarium used for the usual instructional purposes, though as an added refinement to the planetarium such parallax may be corrected. One manner of correction is to mount all of the mirrors 42 on a common axis 32. A further manner of correction may involve the provision of cams to impart a slight correction to the rotational movements of each mirror.

Figure 9:
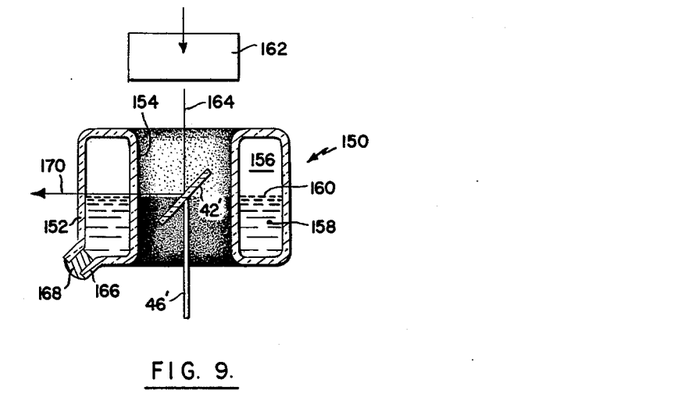
FIGURES 9 and 10 illustrate a modified form of horizon cut-off or occulting device in accordance with the invention.
Figure 10:
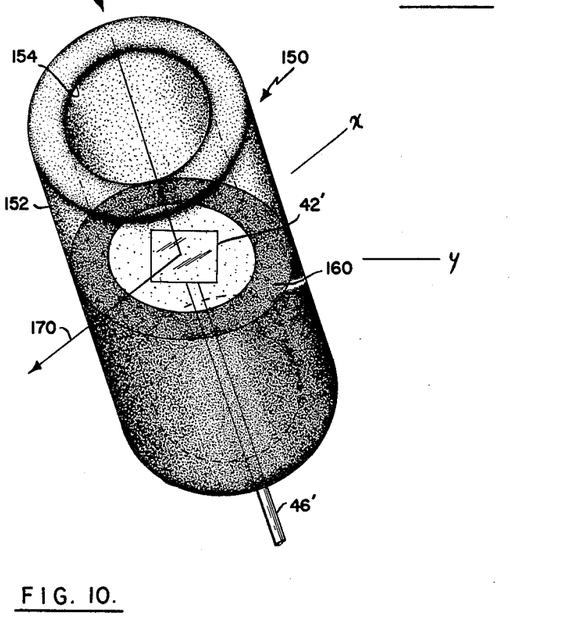

Although a simply constructed shade-like device, such as 128 in FIGURE 4, may be used as a horizon cutoff—in other words, means for occulting light rays to prevent the projection of images below the simulated horizon of the planetarium dome—FIGURES 9 and 10 illustrate a modified form of horizon cutoff which may be employed in conjunction with the planet projecting means illustrated in FIGURES 3 to 8. Referring first to FIGURE 9, there is generally indicated at 150 a capsule blown or molded from clear glass or an equivalent material. Capsule 150 takes the form of concentric tubes having the gap between their respective walls closed at the opposite ends of the tubes. Actually, as will be seen from FIGURE 9 this configuration may be obtained by forming the capsule 150 of a single piece of glass in a hollow annular or doughnut shaped form. Thus, in the particular case of FIGURE 9 the cross-section of the circularly extending glass is rectangular, being formed by parallel vertically extending walls 152 and 154 which are analogous to or may be considered concentric tubes. The inner space 156 of the capsule contains a liquid 158, the upper surface or level of which is indicated at 160. The liquid 158 is darkly colored so that it will be essentially opaque to light rays and preferably is of such a chemical nature that there is no capillary attraction between it and the glass walls 152 and 154. In this latter respect the liquid will have much the same qualities as are characteristic of liquids used in ordinary bubble-type levels. There is provided at the center of capsule 150 a mirror 42' that is affixed to a supporting rod 46' and these elements correspond functionally to the mirror 42 and block 46 previously described with reference to FIGURE 4. To compensate for convexity, in a horizontal plane of the capsule, a suitable lens such as the cylindrical lens 162 is provided in the path of the incident light beam 164, which corresponds to beam 43.

It will be understood that capsule 150 is completely closed and liquid-tight. For the purpose of filling the capsule it is provided with a neck 166 defining an opening which, after filling, is closed by a plug 168.

The capsule 150 is, of course, positioned properly with respect to the mirror 42' by being mounted on the platform 81, in somewhat the same manner as the shade 128 is mounted, or on the plate 86. The oscillating and tilting movements of mirror 42' with respect to capsule 150 are the same as those imparted to the mirror 42. It will be seen from FIGURE 9 that the space 156 is filled with liquid to a level 160 representing half the total volume of the capsule. The reason for this fact will be more evident hereafter, but for the present it will be noted that if the light beam 170 reflected by the mirror 42' falls below the level 160 it will not be transmitted through the glass walls of the capsule so as possibly to project an image below the simulated horizon of the planetarium dome.

In operation, it will be understood that the projecting unit, previously described with reference to FIGURES 4 to 8, will be oriented at various angles with respect to the vertical. Nevertheless, the capsule 150 will act in the same manner as an ordinary level in that the liquid surface always will be horizontal. For example, referring to FIGURE 10 the capsule is shown with its axis 164 inclined to the vertical or zenith 172, but despite this inclination the liquid surface 160 remains in a plane represented by horizontal coordinates *x* and *y*. In such manner, it is insured that the reflected beam 170 cannot be directed downwardly sufficiently to project an image below the planetarium horizon.

As in the case of shade 128, if the projection unit happens to be operating in an upside-down position the liquid 158 will merely be transferred to the upper portion of the capsule as viewed in FIGURE 9, and because the space 156 is filled with liquid to the halfway mark the liquid surface or level will continue to bear the same relation to beam 170. As previously explained, the projectors 16 and 18 (FIGURE 3) are adjustable about axis 24 to achieve settings for different latitudes of observation. Therefore, it will be evident that in such case the cage 38 of individual projectors may be either above or below axis 24 and consequently they may be either upright or inverted.

Figure 11:
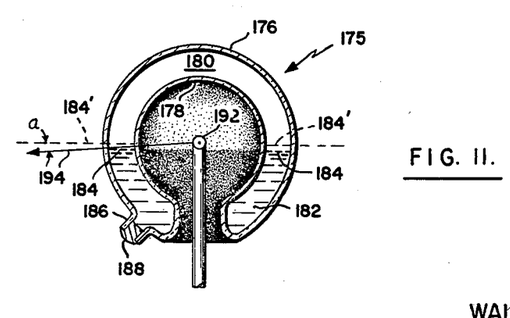
FIGURE 11 illustrates a further modified form of occulting means.

A further embodiment of the occulting means providing horizon cutoff is illustrated in FIGURE 11. A capsule 150 as just described with reference to FIGURES 9 and 10 is broadly applicable to the occulting of light beams projecting images of celestial bodies generally, whether they be planets or stars as examples. Typically, a star field may be projected by a point source of light positioned within the star projector but here, as well as in the projection of planet images, there is the problem of horizon cutoff. To illustrate this dual applicability of the instant occulting means it will be described in connection with the occulting of light from such a point source (192) rather than from a reflecting mirror. Referring then to FIGURE 11, there is shown a capsule 175 which is similar to capsule 150 in that it is blown or molded from clear glass or an equivalent material. Capsule 175 essentially is in the form of a pair of spherical sections, one being within the other. Thus, there is an outer wall 176 and an inner wall 178, these walls having at least their upper portions in the form of hemispheres. Within the capsule 175 there is defined a space 180 which is partially filled with an opaque, non-capillary liquid 182 to a level 184. A neck 186 is integrally formed on the capsule and defines an opening for the filling thereof with liquid, this opening thereafter being closed by a plug 188. A point source of light 192, of suitable and well-known type, is located at the center of the capsule. The point source 192 is distinguishable from a concentrated light beam reflected from a mirror, as involved in the previous description, projecting images representing planets in that light rays emitted from source 192 spread throughout 360° in any central vertical plane. It will be understood, however, that the point source 192 is intended to be positioned within a dodecahedron or the like which establishes the pattern of the star field projected on the planetarium dome. As in the case of the aforedescribed planet projection units, such as a dodecahedron is tilted from the vertical (about axis 24 in FIGURE 3) for the setting of various latitudes of observation, but nevertheless the surface or level 184 of the liquid always will be in a horizontal plane. Light rays from source 192 that fall below level 184 will not be transmitted, and thus there is achieved an effective horizontal cutoff or occulting.

Because the dodecahedron is rotatable about axis 24, depending upon the latitude setting it may be either above or below axis 24 and hence either higher or lower with respect to the horizon of the planetarium dome. Therefore, when the dodecahedron is in its upper position it is desirable to permit light rays 194 which are directed slightly downwardly to pass above the liquid level 184 without occulting. When the dodecahedron is in its lower position the liquid 182 will be transferred to the portion of space 180 which is at the top of the capsule 175 as viewed in FIGURE 11. In this lower position, since the dodecahedron then may be below the horizon of the planetarium dome, it is desired to cut off light rays directed horizontally and/or directed slightly upwardly. In other words, assume that when capsule 175 is turned upside-down the liquid level is as indicated at 184'. Then, only those light rays directed upwardly above the horizontal (imagining now that FIGURE 11 is turned upside-down) by at least an angle *a* will not be cut off by the liquid 182. The desired result is, therefore, attained by the proper dimensioning of capsule 175 so that in its upright and inverted positions the liquid will be at the levels 184 and 184', respectively.

In connection with the matter just described, that is the dimensioning and filling of the capsule to compensate for elevation of the projection apparatus above or below the planetarium horizon, it should be understood that this is equally applicable to the capsule shown in FIGURE 9.

Figure 12:
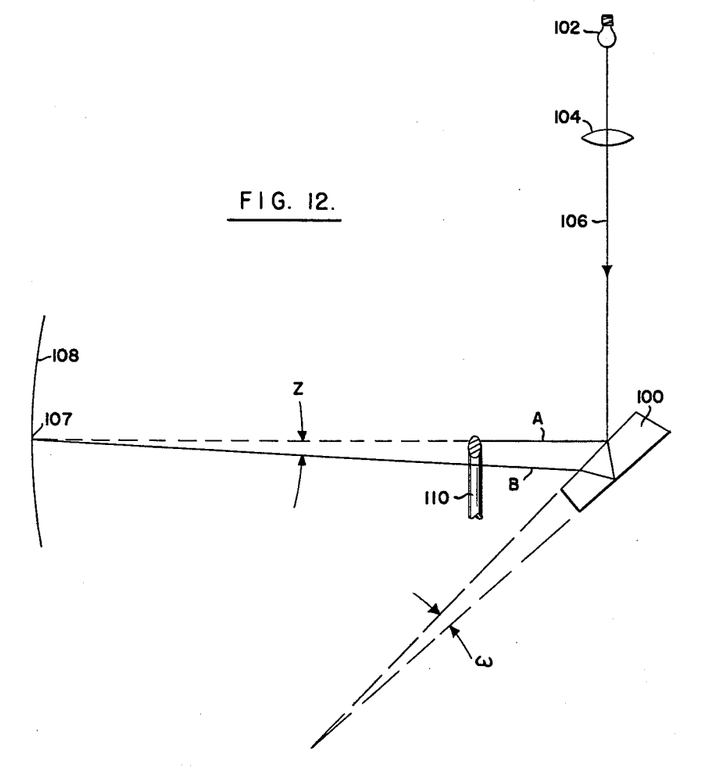
FIGURE 12 illustrates optional means for dividing the image-projecting light beams to reduce the effect of occultation by the projector housing cage structure.

Reference has been made to the matter of dividing a light beam to prevent interference thereof by the struts of the cage sections 38 (FIGURE 3). According to the invention, as will now be described with reference to FIGURE 12, an image may be projected by split beams converging at a point on a planetarium dome so that occulation by the struts is minimized. According to FIGURE 4 the reflection of an incident beam emanating from the light source is effected by a mirror 42, whereas according to the modification in FIGURE 12 this same function is carried out by a wedge 100 formed of optical glass. FIGURE 12 is not drawn to scale, and for the purpose of schematic illustration the wedge angle $x$ is greatly exaggerated. In practice the angle $x$, between the upper and lower faces of optical wedge 100, may be of the order of 0°3'. Light is directed from a source 102 through suitable lens 104 in an incident beam 106, and on striking the optical wedge 100 it is reflected in beams A and B converging on a point 107 of the planetarium dome 108 though separated by an angle $z$. This splitting of incident beam 106 into reflected beams A and B is, of course, due to the reflection of light from the lower face of the wedge, this face being at an angle to the upper face as mentioned. A strut of the cage is indicated at 110 and is inclined at an angle of about 45° to the plane of the drawing of FIGURE 12. Thus it will be seen that beam A is blocked by the strut 110 while beam B passes under the strut to produce an image at the point 107. The result is that despite the partial occulting by strut 110 there is produced, nevertheless, the desired planet image.

It will be understood that various departures from the specifically disclosed embodiment may be made without departing from the scope thereof as defined by the following claims.

What is claimed is:

1. Planet projection apparatus comprising an assembly of individual units for projecting images of respective planets, and including individual synchronous motor means for driving each unit and a common variable frequency source for driving a plurality of said synchronous motor means.

2. Planet projection apparatus comprising an element, means mounting said element for rotation about an axis, means rotating said element about said axis, means revolving said axis about a fixed second axis, means positioned at said second axis for directing a beam of light outwardly therefrom, and means imparting to the last-mentioned means rotational movements about said second axis and maintaining the same in substantially fixed angular relationship with respect to a line connecting said second axis and a given point on said element.

3. Apparatus according to claim 2, including means for varying the luminosity of said beam of light as a function of the distance between said element and said second axis, thereby to simulate naturally occurring changes in planet appearance.

4. Planet projection apparatus comprising an element, means mounting said element for rotation about an axis, means rotating said element about said axis, means revolving said axis about a fixed second axis, means for directing a beam of light along said second axis, mirror means at said second axis adapted to reflect said beam at an angle thereto, and means imparting to said mirror means rotational movement about said second axis and maintaining the same in substantially fixed angular relationship with respect to a line connecting said second axis and a given point on said element.

5. Apparatus according to claim 4 including means for varying the luminosity of the reflected beam as a function of the distance between said element and said second axis, thereby to simulate naturally occurring changes in planet appearance.

6. Apparatus according to claim 4, wherein said first and second axes are non-parallel, whereby said element is caused to rotate in a plane inclined to a plane normal to said second axis, and including means for varying the light reflecting angle of said mirror means in accordance with such inclination.

7. Apparatus according to claim 4, including means for varying the angle of the light beam reflected by said mirror means with respect to a plane normal to said fixed second axis.

8. Planet projection apparatus comprising an element mounted for rotation about an axis, means for rotating said element about said axis, a second element, means mounting said second element for rotation about an axis fixed with respect to the first-mentioned element, means for rotating said second element about the last-mentioned axis, means for directing a beam of light along the first-mentioned axis, means positioned at said first-mentioned axis and adapted to reflect said beam at an angle thereto, and means for transmitting to the reflecting means rotational movements about the first-mentioned axis and maintaining the same in substantially fixed angular relationship with respect to a line between the first-mentioned axis and a given point on said second element.

9. Apparatus according to claim 8, including means for varying the light reflecting angle of said reflecting means to cause the reflected beam to sweep in a plane inclined to a plane normal to said fixed axis.

10. Apparatus according to claim 8, wherein said axes are non-parallel, whereby said given point on the first-mentioned element rotates in a plane inclined to a plane normal to the fixed axis, and including means for varying the light reflecting angle of said reflecting means to cause the reflected beam to sweep in a plane inclined to said normal plane at an angle directly related to such inclination.

11. Apparatus according to claim 8, including means for varying the intensity of the light beam reflected and representing the image of a planet, comprising a light filter having variable light transmitting characteristics across its area, and means for variably positioning the reflecting means with respect to the light beam.

12. Planet projection apparatus comprising an element mounted for rotation about a fixed axis, means rotating said element about said axis, a second element rotatably mounted on the first-mentioned element, means for rotating said second element with respect to the first-mentioned element, means for directing a beam of light along said fixed axis, mirror means positioned at said fixed axis, and means imparting to said mirror means rotational movement about said fixed axis and maintaining the same in substantially fixed angular relationship with respect to a line connecting said fixed axis and a given point on said second element.

13. Apparatus according to claim 12, including means tilting said mirror means about an axis normal to said fixed axis to vary the light reflecting angle thereof.

14. Apparatus according to claim 12, including means varying the light reflecting angle of said mirror means to cause the reflected light beam to sweep in a plane inclined to a plane normal to said fixed axis.

15. Planet projection apparatus according to claim 12, including a synchronous motor and gear means for rotating said first-mentioned element and for revolving the first-mentioned axis about said fixed axis.

16. Planet projection apparatus comprising an element, means mounting said element for rotation about an axis, means rotating said element about said axis, means revolving said axis about a fixed second axis, means directing a beam of light along said second axis, mirror means, means positioning said mirror means at said second axis and freely mounting the same for rotation about the second axis, the mirror means thereby being adapted to reflect said beam at an angle to said second axis, a member rigidly connected at one end to said mirror means, and means pivotally and reciprocably connecting the other end of said member to a given point on said element, whereby said mirror means is maintained in substantially fixed angular relationship with respect to a line connecting said second axis and said given point.

17. Apparatus according to claim 16, wherein said means for rotating said element about said axis and said means for revolving said axis about a fixed second axis comprise an epicyclic gear train and synchronous motor means driving said gear train.

18. Apparatus according to claim 16, wherein said first and second axes are non-parallel, whereby said element rotates in a plane inclined to a plane normal to said second axis, and including means varying the light reflecting angle of said mirror means in accordance with such inclination.

19. Apparatus according to claim 16, including means tilting said element about an axis normal to the first-mentioned axis, said mirror means also being mounted for tilting movement about an axis normal to said second axis, said member thereby being adapted to transmit tilting movements of said element to said mirror means.

20. The combination comprising means for projecting a light beam to produce an image representing the relative movements of a celestial body and means for varying the appearance of said image comprising a light filter having variable light transmitting characteristics across its area and means for variably positioning said filter in the path of the projected light beam producing said image.

21. The combination comprising means for projecting a light beam to produce an image representing the relative movements of a celestial body and means for cutting off the projected light beam at a horizon, the last-mentioned means comprising a filter element mounted in the path of said light and having its light transmitting characteristics varying from transparent to essentially opaque in the direction which the image travels toward the horizon.

22. The combination comprising means for projecting a light beam to produce an image representing the relative movements of a celestial body and means for cutting off the projected light beam at a horizon, the last-mentioned means comprising a transparent container partially filled with an opaque liquid and positioned in the path of the projected light.

23. The combination comprising means for projecting a light beam to produce an image representing the relative movements of a celestial body and means for cutting off the projected light beam at a horizon, the last-mentioned means being positioned in the path of the projected light and comprising a pair of spaced transparent walls defining therebetween a container partially filled with an opaque liquid.

24. The combination comprising means for projecting a light beam to produce an image representing the relative movements of a celestial body and means for cutting off the projected light beam at a horizon, the last-mentioned means comprising a closed capsule defined by transparent spaced and annular walls extending around said means projecting the light, said capsule being partially filled with an opaque liquid.

25. The combination comprising means for directing a beam of light along an axis, reflecting means positioned at said axis and adapted to reflect the light beam to project a light image representing a planet, and means for cutting off the projected light at a horizon, the last-mentioned means comprising a closed transparent capsule defined partially by annular and concentric walls surrounding said reflecting means, said walls being spaced and such closed space therebetween being partially filled with an opaque liquid.

26. The combination according to claim 25, wherein said walls are tubular.

27. The combination comprising a source of light and means for cutting off at a horizon light rays emitted from said source, the last-mentioned means comprising a capsule defined partially by a pair of concentric substantially spherical and transparent walls surrounding said source, said walls being spaced and such space therebetween being partially filled by an opaque liquid.

28. Planet projection apparatus comprising a supporting cage structure including strut members, and means for projecting outwardly from within said structure a light image representing the relative movements of a planet, the last-mentioned means including reflecting means adapted to reflect an incident light beam as a plurality of converging beams, whereby if some of the reflected light is interrupted by a strut member other reflected light will nevertheless miss the strut member.

29. Apparatus for projecting an image of a planet comprising a light source, means defining an axis, means directing in a path in the direction of said axis a beam of light emanating from said source, light reflecting means, means positioning said light reflecting means in said light path to reflect said beam of light and mounting the same for rotation about said axis, means for imparting to the reflecting means rotational movements about said axis to direct the reflected light beam along the line of sight to said planet, and means for varying the light reflecting angle of said reflecting means relative to said axis to cause said reflected light beam to sweep in a path corresponding to that of the planet movements.

30. Apparatus for projecting an image of a planet comprising a light source, means defining an axis, means directing in a path in the direction of said axis a beam of light emanating from said source, light reflecting means, means positioning said light reflecting means in said light path to reflect said beam of light and mounting the same for rotation about said axis, and means for imparting to the reflecting means variable speed rotational movements about said axis to direct the reflected light beam along the line of sight to said planet, thereby to simulate apparent planetary motion.

31. Apparatus for projecting an image of a planet comprising in combination a light source, means defining an axis, means directing in a path in the direction of said axis a beam of light emanating from said source, light reflecting means, means positioning said light reflecting means in said light path to reflect said beam of light and mounting the same for rotation about said axis, means for imparting to the reflecting means rotational movements about said axis to direct the reflected light beam along the line of sight to said planet, and means for varying the intensity of said reflected light beam, thereby to vary the appearance of said image, comprising a light filter having variable light transmitting characteristics across its area and means for variably positioning the same in said path of light.

32. Apparatus for projecting an image of a planet comprising in combination a light source, means defining an axis, means directing in a path in the direction of said axis a beam of light emanating from said source, light reflecting means, means positioning said light reflecting means in said light path to reflect said beam of light and mounting the same for rotation about said axis, means for imparting to the reflecting means rotational movements about said axis to direct the reflected light beam along the line of sight to said planet, and means for varying the intensity of said reflected light beam, thereby to vary the appearance of said image, comprising a light filter having variable light transmitting characteristics across its area and means for variably positioning the same across said axis in the path of said light.

33. Apparatus for projecting an image of a planet comprising in combination a light source, means defining an axis, means directing in a path in the direction of said axis a beam of light emanating from said source, light reflecting means, means positioning said light reflecting means in said light path to reflect said beam of light and mounting the same for rotation about said axis, means for imparting to the reflecting means rotational movements about said axis to direct the reflected light beam along the line of sight to said planet, and means for cutting off the reflected light at a horizon comprising a container positioned in the path of the reflected beam of light and partially defined by spaced transparent walls, said container being partially filled with an opaque liquid.

34. Apparatus for projecting an image of a planet comprising in combination a light source, means defining an axis, means directing in a path in the direction of said axis a beam of light emanating from said source, light reflecting means, means positioning said light reflecting means in said light path to reflect said beam of light and mounting the same for rotation about said axis, means for imparting to the reflecting means rotational movements about said axis to direct the reflected light beam along the line of sight to said planet, and a supporting cage structure enclosing the above-mentioned means and said light source, said reflecting means being adapted to reflect the incident beam as a plurality of converging projected beams, whereby complete interference by said supporting cage structure is prevented.

35. Apparatus for projecting images of a plurality of planets comprising in combination an assembly of individual projection units, means for driving said units at different relative speeds comprising individual synchronous electric motor means for each unit, and a common variable frequency source for operating said motor means for the plurality of units, thereby to effect synchronization of the motor means at variable speeds, each of said units comprising: means defining an axis, means directing in a path in the direction of said axis a beam of light emanating from said source, light reflecting means, means positioning said light reflecting means in said light path to reflect said beam of light and mounting the same for rotation about said axis, and means for imparting to the reflecting means rotational movements about said axis to direct the reflected light beam along the line of sight to one of said planets.

36. In a planetarium, a plurality of units adapted to project images of planets moving at different and nonuniform rates of speed in circular paths approximately parallel to the plane of the ecliptic, each of the last-mentioned means comprising: means defining an axis substantially perpendicular to the plane of the ecliptic, means directing in a path in the direction of the last-mentioned axis a beam of light, light reflecting means, means positioning said light reflecting means in said light path to reflect said beam of light and mounting the same for rotation about said axis, and means imparting to the reflecting means variable rotational movements about said last-mentioned axis to direct the reflected light beam along the line of sight to one of said planets, said rotational movement imparting means of the various units effecting different rotational movements of the respective reflecting means to simulate the relative motions of the planets.

37. In a planetarium, a plurality of units adapted to project images of planets moving at different and nonuniform rates of speed in circular paths approximately parallel to the plane of the ecliptic, each of the last-mentioned means comprising: means defining an axis substantially perpendicular to the plane of the ecliptic, means directing in a path in the direction of the last-mentioned axis a beam of light, light reflecting means, means positioning said light reflecting means in said light path to reflect said beam of light and mounting the same for rotation about said axis, means imparting to the reflecting means variable rotational movements about said axis to direct the reflected light beam along the line of sight to one of said planets, and means for varying the light reflecting angle of said reflecting means relative to said last-mentioned axis, said rotational movement imparting means of the various units effecting different rotational movements of the respective reflecting means to simulate the relative motions of the planets.

38. Apparatus for projecting images of a plurality of planets comprising in combination an assembly of individual projection units, means for driving said units at different relative speeds comprising individual synchronous electric motor means for each unit, and a common variable frequency source for operating said motor means for the plurality of units, thereby to effect synchronization of the motor means at variable speeds.

References Cited in the file of this patent

UNITED STATES PATENTS

| 1,616,736 | Bauersfeld | Feb. 8, 1927 |
| 1,955,315 | Styer | Apr. 17, 1934 |
| 2,827,827 | Spitz | Mar. 25, 1958 |
| 2,952,188 | Bang | Sept. 13, 1960 |

FOREIGN PATENTS

| 322,507 | Germany | July 1, 1920 |